Dec. 28, 1965 H. HORGEN ETAL 3,225,751
INTERNAL COMBUSTION ENGINES, AND IN PARTICULAR
FREE PISTON ENGINES, OF THE GASEOUS
FUEL INJECTION TYPE
Filed May 7, 1963 2 Sheets-Sheet 1

INVENTOR
HELGE HORGEN AND
MAURICE BOUVIER
BY Bailey, Stephens
ATTORNEY 3,225,751
INTERNAL COMBUSTION ENGINES, AND IN PARTICULAR FREE PISTON ENGINES, OF THE GASEOUS FUEL INJECTION TYPE
Helge Horgen, Lyon, and Maurice Bouvier, Villeurbanne, France, assignors to "Societe d'Etudes et de Participations, Eau, Gaz, Electricite, Energie S.A.," Geneva, Switzerland, a society organized under the laws of France
Filed May 7, 1963, Ser. No. 278,733
Claims priority, application France, May 9, 1962, 897,022
7 Claims. (Cl. 123—46)

The present invention relates to internal combustion engines wherein a gaseous fuel is injected on every engine cycle, the amount of gaseous fuel thus injected on every engine cycle being hereinafter called "gaseous fuel dose." The invention is more especially, but not exclusively, concerned with free piston machines and in particular with groups of generators of this kind serving to feed a hot gas under pressure to a receiver turbine.

The chief object of our invention is to provide an engine of this kind which is better adapted to meet the requirements of practice than those used up to this time, especially concerning the safety of operation.

The engine with which this invention is concerned comprises, for the inflow of gaseous fuel into at least one combustion chamber, at least one inlet valve controlled in such manner as to place, for a given period of every cycle of the engine, said combustion chamber into communication with a buffer chamber fed with gaseous fuel at a substantially constant pressure. According to a main feature of the present invention we provide, between said buffer chamber and said inlet valve, safety means responsive to variations of at least one factor of operation of the engine and capable, when said factor assumes an alarming value, of cutting off any communication between said buffer chamber and the inlet valve controlling the injection of gaseous fuel into said combustion chamber, said safety means being preferably arranged in such manner as further to place at atmospheric pressure the portion of the gaseous fuel circuit extending between said inlet valve and said safety means.

Other features of our invention will result from the following detailed description of some embodiments thereof.

Preferred embodiments of the present invention will be hereinafter described with reference to the appended drawings, given merely by way of example, and in which:

FIG. 1 diagrammatically shows, in sectional view, the fuel injection system of a free piston machine fed with gaseous fuel, according to a first embodiment of the invention;

In the following description, it will be supposed that the invention is applied to a free piston auto-generator.

Figures 1, 2:
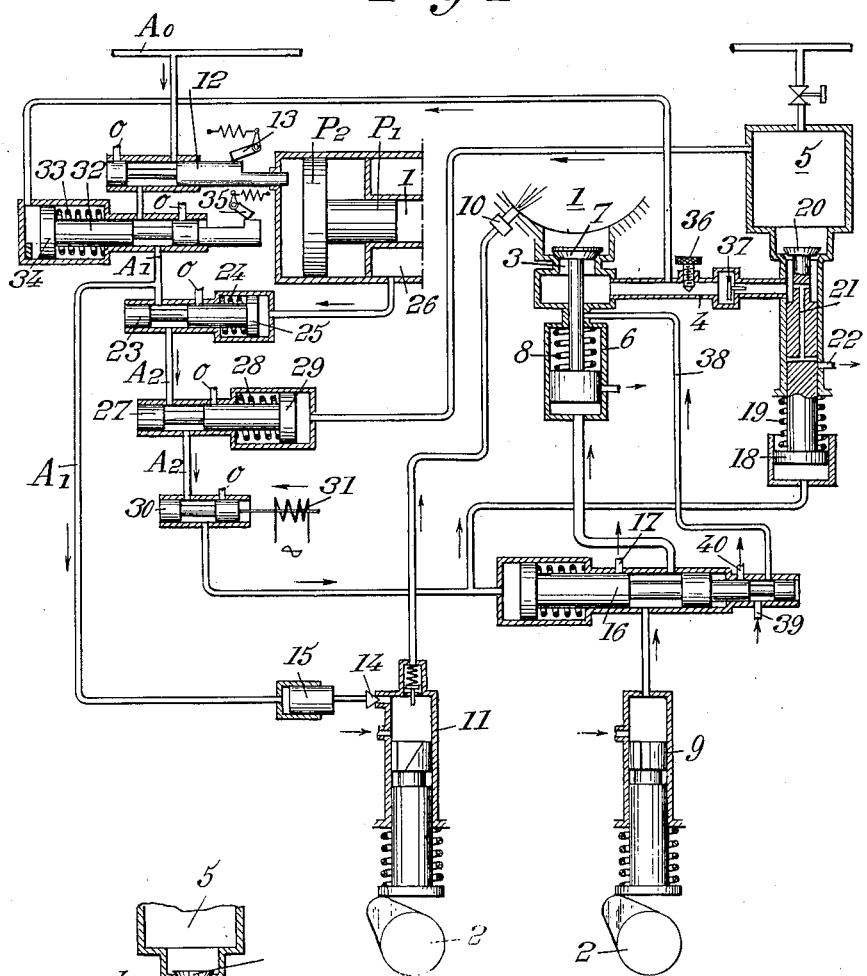
FIG. 2 shows in operative position a safety device belonging to said machine and shown in position of rest by FIG. 1.

Concerning this auto-generator, and with the exception of the injection system to be provided for the periodical introduction of gaseous fuel doses into its cylinder, it may be made of any suitable construction and in particular, as shown by FIG. 1, such an auto-generator comprises a main cylinder 1 wherein are provided two motor pistons $P_1$ (only one of which is visible on the drawings) having opposed movements and connected together through a synchronizing device comprising, or capable of actuating, an oscillating shaft 2, each of said motor pistons $P_1$ being rigid with a compressor piston $P_2$, respectively.

For the injection of gaseous fuel into cylinder 1 we provide, in the middle zone of said cylinder, at least one inlet orifice 3 (possibly several such orifices disposed along an annular zone) for introducing into said cylinder 1 doses of a gaseous fuel under pressure fed to said inlet orifice 3, through a feed conduit 4, from a buffer chamber 5 where the gaseous fuel is kept at a substantially constant pressure.

The gaseous fuel injection system comprises, in a known manner, as many injectors 6 as there are inlet orifices 3, every injector 6 comprising a valve 7 normally kept in closed position by a spring 8.

We provide, for cyclically opening the inlet valve 7 which controls orifice 3, a hydraulic control device comprising a hydraulic pump 9 operated by oscillating shaft 2.

Preferably, there is further provided a liquid fuel feed system intended in particular to be used for starting the engine and possibly under normal working conditions, such a liquid fuel feed system comprising injectors 10 fed from a hydraulic pump 11.

The invention is chiefly concerned with safety arrangements intended to stop the operation of the gaseous fuel feed system of the engine, or of at least some portions of said system, when the circumstances are such that it is preferable, or even necessary, to stop said operation.

It should first be reminded that it is known to make the operation of a free piston generator cooperating with a receiver machine dependent upon the value of a a safety pressure the drop of which, due to an incident occurring in the operation of the receiver machine (racing, drop of the lubricating pressure, and so on), causes the generator to stop. This safety pressure is provided, for instance, in a known manner, by a fluid the pressure of which varies in the dependence of the load of said receiver engine.

When, as it will be hereinafter supposed by way of example, the generator that is considered belongs to a group of generators feeding fluid under pressure in parallel to the receiver machine, all of the generators of the group are controlled by the same pressure called "general safety pressure of the group" the drop of which below a given value causes all the generators to be stopped, this pressure being that existing in a circuit $A_0$ connected in parallel with the outputs of the generators.

It is also known to provide, on the extensions $A_1$ of circuit $A_0$ into every generator, safety means depending upon the value or values, of one or several factors of operation of the generator that is considered and the action of which is to stop this generator, without this action being transmitted to the other generators of the group. In such instance the pressure supplied through circuit $A_0$ acts as the servomotor pressure controlling this generator.

For instance, it is possible, as it will be hereinafter supposed, to have circuit $A_1$ controlled by a slide valve 12 capable of occupying and keeping (owing to a pawl 13) in case of too long a stroke of the pistons $P_1$, $P_2$ of the machine, a position for which circuit $A_1$ is cut off from circuit $A_0$ and connected with an exhaust pipe, which permits the opening of a discharge valve 14 provided in the delivery circuit of the fuel injection pump 11, this valve 14 being normally kept in closed position by a piston 15 subjected to the pressure existing in circuit $A_1$.

In order to facilitate a good understanding of the operation of the devices serving to reduce the safety pressures of the generators we have designated on the drawings in a general manner by letter $o$ the discharge orifices of said devices.

We will now successively examine the various features of the invention concerning the gaseous fuel feed system of the machine.

According to one of these features, we connect with the general safety circuit $A_1$ of the generator, downstream of all the safety devices provided in circuit $A_1$ for reducing the pressure in said circuit, a safety circuit $A_2$ which is only concerned with the gaseous fuel feed and in which are provided one or several safety devices each capable of cutting off from upstream and of connecting with a discharge conduit the portion of circuit $A_2$ located downstream of the safety device that is considered.

The pressure existing in safety circuit $A_2$ is thus made to control:

On the one hand, a slide valve 16 disposed in the delivery circuit of pump 9 which controls the gaseous fuel injector 6, said slide valve 16 being arranged in such manner that, in the case of a pressure drop in circuit $A_2$, it cuts off the communication between said pump and said injector 6, pump 9 then becoming inoperative due to the opening, by said slide valve 16, of a discharge orifice 17; and, On the other hand, a piston 18 capable of controlling, against the action of a spring 19, a cut off valve 20 capable, when it is in closed position, of separating buffer chamber 5 from the conduit 4 through which said buffer chamber 5 is connected with the gaseous fuel inlet orifice 3, the pressure existing in circuit $A_2$ normally keeping cut off valve 20 open (case of FIG. 1) and the drop of this pressure causing said valve 20 to close under the action of spring 19 (case of FIG. 2).

Although either of said means for placing the gaseous fuel feed under control of the safety pressure existing in circuit $A_2$ is sufficient to cut off the gaseous fuel feed in case of a drop in said pressure, it will be understood that it is of interest to make use of both of said means simultaneously.

Furthermore, preferably, as shown by the drawings, the closing of cut off valve 20 simultaneously produces a discharge of the fuel present in conduit 4 located downstream of said cut off valve 20. For this purpose, the rod of valve 20 is provided with a passage 21 communicating, on the one hand, permanently with feed conduit 4, and, on the other hand, when said valve 20 is in closed position (FIG. 2) with a discharge conduit 22.

Concerning now the safety means to be provided in circuit $A_2$ to connect the whole or a portion of said circuit with a discharge space under given conditions, said safety means may be made as shown by FIG. 1, where circuit $A_2$ is provided, with three safety devices mounted in series, to wit:

A first safety device intended to permit of starting the engine with only liquid fuel and comprising valve 23 subjected, on the one hand, to the action of a spring 24 tending to place said valve 23 in the position where circuit $A_2$ is connected with the outside and, on the other hand, to the antagonistic action of a piston 25 upon which acts the pressure existing in the feed casing 26 of the engine. Said piston 25 is capable of holding valve 23 in the position (shown by FIG. 1) where circuit $A_2$ is in communication with circuit $A_1$ when the feed pressure of the engine has reached a predetermined value ensuring the actual starting of said engine;

A second safety device intended to ensure the provision of a sufficient feed pressure of gaseous fuel and consisting of a valve 27 subjected, on the one hand, to the action of a spring 28 tending to connect the downstream portion of circuit $A_2$ with the atmosphere, and on the other hand, to the antagonistic action of a piston 29 subjected to the pressure existing in buffer chamber 5. Said piston 29 is capable of maintaining slide valve 27 in the position (shown by FIG. 1) where circuit $A_2$ is fed with liquid from circuit $A_1$, when the pressure in buffer chamber 5 has reached a predetermined value corresponding preferably to the pressure which is to exist in said buffer chamber 5 under normal working conditions; and A third safety device consisting of a slide valve 30 capable of occupying either a position (shown by FIG. 1) where it permits of placing under pressure the downstream end of circuit $A_2$ (and therefore permits cyclic control of the gaseous fuel injector 6 and ensures the opening of cut off valve 20), or a position in which it connects with the outside the downstream portion of circuit $A_2$ (and therefore cuts off the control of said injector 6 and permits the closing of said cut off valve 20). The passage of slide valve 30 from one to the other of these two positions is controlled by an operating device 31, for instance of the electric type, manually controlled or possibly operated by a program device or in response to the variations of a factor of operation (for instance the thermal level) of the system.

It should be noted that this last mentioned safety device 30, disposed at the downstream end of circuit $A_2$ (that is to say immediately upstream of slide valve 16 and piston 18 which control injector 6 and cut off 20 respectively), acts, with respect to the gaseous fuel feed means, as the last control element which permits, if all the conditions are complied with, of operating the system, either at will, or after a certain time (program device), or again automatically once the system can work with gaseous fuel (working thermal level reached).

Besides, it will be of interest, according to another feature of the invention, to provide a safety device capable of cutting off both the gaseous fuel feed and the liquid fuel feed in case of breaking or seizing in the open position of the gaseous fuel inlet valve 7.

This safety device may be constituted by a valve 32 mounted in the general safety circuit $A_1$ downstream of the safety device 12 responsive to the strokes of excessive length of the reciprocating pistons of the engines, said slide valve 32 normally occupying, under the action of a spring 33, the position shown by FIG. 1 where circuit $A_1$ is under pressure, whereas a piston 34 subjected to the pressure existing in the conduit 4 serving to the feed of gaseous fuel is capable of bringing said slide valve 32, when said pressure on the left hand side of piston 34 becomes too high, into a position where it remains locked by a pawl 35 and for which the downstream portion of circuit $A_1$ and the whole of circuit $A_2$ are connected with the discharge, thus cutting off both of the feeds of fuel, i.e. the liquid fuel feed and the gaseous fuel feed.

In the examples shown by the drawings, there is provided in conduit 4 an adjustable throttling member 36 which permits of modifying the importance of the gaseous fuel doses. In this case the pressure collecting means serving to control slide valve 32 preferably branch off from the portion of conduit 4 located downstream of said throttling member 36.

In order to prevent any back flow of a hot gaseous stream toward buffer chamber 5 in case of breaking or seizing in the open position of inlet valve 7, we provided in conduit 4 a check valve 37 preferably located, as shown, between the connection to slide valve 32 and cut off valve 20.

We will now examine, still with reference to FIG. 1, a particular feature of the invention relating to the case where the gaseous fuel injector 6 is provided with a lubricating system 38, which is useful under normal working conditions but risks of giving rise, in case of stopping of the gaseous fuel feed, to an accumulation of combustible lubricant which is dangerous when said gaseous fuel feed is resumed.

According to this particular feature, lubricating system 38 is controlled by the movable element of the slide valve 16 interposed between pump 9 and the gaseous fuel injector 60, and this in such manner that the lubricant inlet 39 is cut off from the lubricating system 38 and placed in communication with a discharge conduit 40 when a pressure drop at the downstream end of safety circuit $A_2$ produces a displacement of piston 16 which cuts off the feed of fuel from pump 9 to injector 6.

The starting of such a generator is as follows, the general safety pressure of the group of generators being supposed to exist in circuit $A_0$:

In what follows, we will call "authorization position" the position of a safety slide valve permitting of establishing near the downstream end a safety pressure supplied from the upstream end, and "interdiction position" the position of this slide valve cutting off the downstream end from the upstream end while placing the downstream end in communication with a low pressure discharge space.

Initially, slide valve 12 is in authorization position in view of the fact that the pistons of the engine have been returned to positions close to their inner dead center positions for starting the engine.

In a likewise manner, slide valve 32 is in authorization position, due to the fact that there is still no pressure in the gaseous fuel feed conduit 4.

On the contrary slide valve 23 is in interdiction position, due to the fact that the casing 26 of the generator is not yet under pressure.

It follows that safety circuit $A_2$ is cut off from circuit $A_1$ by slide valve 23, all the safety slide valves 23, 27 and 30 which relate to said circuit $A_2$ being then generally in interdiction position.

The gaseous fuel feed circuit is therefore temporarily inoperative whereas the system for feeding liquid fuel is capable of operating due to the fact that safety circuit $A_1$ is wholly under pressure and keeps the discharge valve 14 of the liquid fuel pump 11 in closed position.

The machine therefore starts working on liquid fuel and the pressure in casing 26 gradually reaches its normal value, thus restoring slide valve 23 into authorization position. Buffer chamber 5 is then fed with gaseous fuel, this operation having for its effect to return slide valve 27 into authorization position. Finally, slide valve 30 is brought into authorization position, this last mentioned operation placing under pressure the whole of circuit $A_2$ and bringing slide valve 16 into the position where, first, it establishes communication between pump 9 and the gaseous fuel injector 6, secondly, it causes the lubricating circuit 38 of said injector to be branched in and, thirdly, it causes cut off valve 20 to open.

The gaseous fuel feed system is then ready to operate.

Stopping of the two feed systems of the generator and therefore stopping of the latter can then be produced:

Either by a pressure drop in the safety circuit $A_0$ of the group of generators;

Or, by a stroke of excessive length of the pistons of the generator that is considered (shifting of slide valve 12 into interdiction position);

Or, again, by an excessive increase of the pressure in the gaseous fuel feed conduit 4, due for instance to a breaking of valve 7 (shifting of slide valve 32 into interdiction position).

As for the stopping of the gaseous fuel feed system alone, it may be produced in one of the following conditions:

(a) a great pressure drop in the feed casing 26 of the generator, resulting from a stopping of the machine (shifting of slide valve 23 into interdiction position);

(b) a substantial pressure drop in buffer chamber 5 (shifting of slide valve 27 into interdiction position); and (c) a deliberate or automatic interdiction in connection with a parameter of operation of the machine (thermal level for instance) produced by slide valve 30.

Besides, with such a generator, there are no risks, in case of breaking or seizing in open position of inlet valve 7, of a dangerous flow of combustion gases into the fuel feed circuit since check valve 37 and cut off valve 20 (then closed due to the action of safety slide valve 32) both prevent such a flow.

Figure 3:
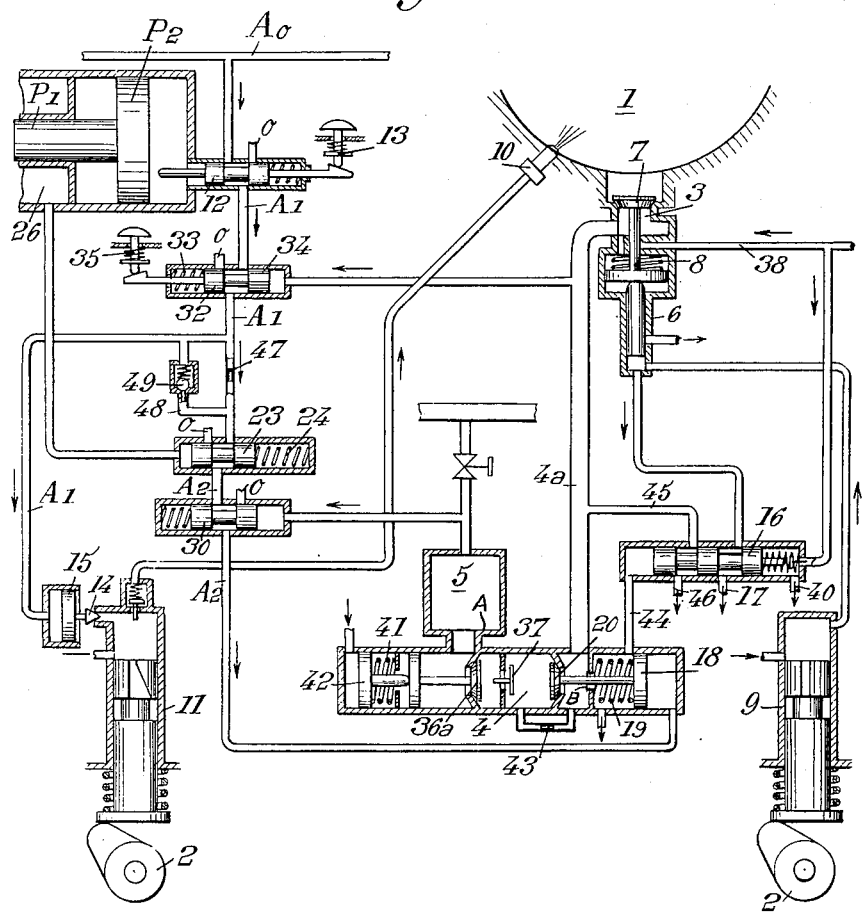
FIG. 3 shows, in the same manner as FIG. 1, another embodiment of the invention.

We will now describe a modification of such a generator with reference to FIG. 3 where the same reference numerals or letters designate the parts already mentioned concerning FIG. 1.

A first feature of this modification is concerned with a supplementary control of cut off valve 20 serving to separate buffer chamber 5 from the inlet orifice 3 when the downstream end of safety circuit $A_2$ is not under pressure.

This arrangement is intended to delay the opening of cut off valve 20 and thus to avoid a massive injection of gas when shifting from liquid fuel operation to gaseous fuel operation.

For this purpose, we proceed as follows:

Cut off valve 20, its control piston 18 and its return spring 19 are arranged, account being taken of the pressures existing respectively in buffer chamber 5 and in safety circuit $A_2$, in such manner that, when cut off valve 20 is closed and subjected to the pressure existing in the buffer chamber, the safety pressure acting upon piston 18 is not sufficient for opening cut off valve 20.

We provide, between cut off valve 20 and buffer chamber 5, a second valve $36_a$ acting as throttling member for adjusting the cross section of flow supplied for the gaseous fuel, this throttling member $36_a$ being opened gradually, against the action of a spring 41, by a piston 42 subjected to the action of a regulating pressure.

Finally, the chambers located respectively immediately upstream and downstream of cut off valve 20 are connected by a by-pass conduit 43 of small cross section area which permits of equalizing the pressures in said respective chambers when throttling member $36_a$ is closed.

Thus as long as the throttling member $36_a$ is not closed, the opening of cut off valve 20 cannot be produced by safety circuit $A_2$ and the operation with gaseous fuel cannot be started. On the contrary, if the regulating pressure permits closing of throttling member $36_a$, the respective pressures upstream and downstream of cut off valve 20 are made equal by means of by-pass 43 and, if circuit $A_2$ is under pressure, said cut off valve 20 opens and remains open. From this time on, if the regulating pressure rises, throttling member $36_a$ is gradually opened and the gaseous fuel, the flow of which is established in gradual manner, flows past cut off valve 20 which has been preliminarily opened and both faces of which are thus subjected to the same pressure, the action of piston 18 being then preponderating.

Another feature of the modification of FIG. 3 consists in branching the control of cut off valve 20 and that of slide valve 16, which controls the gaseous fuel injector 6, no longer in parallel as in the case of FIG. 1, but in series, slide valve 16 being then fed with fluid through a conduit 44 uncovered by piston 18 after the latter has opened cut off valve 20.

This displacement (toward the right) of slide valve 16 produces the following effects:

It closes the discharge conduit 17 of pump 9, said discharge conduit 17 being, in this case, disposed downstream of the control circuit of injector 6 so that the operation of said pump 9 ensures a continuous discharge of the whole of the circuit.

It stops the communication with the exhaust of injector 6 and of the upstream portion $4_a$ of the gaseous fuel feed conduit, which communication to the exhaust takes place through a conduit 45 and a discharge orifice 46.

Finally, it masks the discharge 40 of the lubricating circuit 38 of injector 6.

Another feature of the modification illustrated by FIG. 3 is concerned with the means interposed between safety circuits $A_1$ and $A_2$ in order to slow down the flow from circuit $A_1$ toward circuit $A_2$ while permitting a quick flow in the opposed direction.

Thus, on the one hand, we avoid at the instant when the safety slide valves provided in circuit $A_2$ permit the feed of this circuit a sudden drop of pressure in circuit $A_1$, which pressure drop would risk stopping the useful outflow of the liquid fuel pump 11 (which would stop the generator) and, on the other hand, we permit a quick emptying of circuit $A_2$ in case of shifting into interdiction position of one of the safety slide valves provided in circuit $A_1$.

For this purpose, for instance, we provide, between the last safety slide valve 32 of circuit $A_1$ and the first safety slide valve 23 of circuit $A_2$, a throttled passage 47 capable of delaying the variation of pressure in said circuit $A_2$, and this throttled passage 47 is short-circuited by a passage 48 of large cross section area containing a check valve 49 which permits only the flow of liquid from circuit $A_2$ into circuit $A_1$, with a flow rate substantially more important than that through throttled passage 47.

In a general manner, while we have, in the above description, disclosed what we deem to be practical and efficient embodiments of the invention, it should be well understood that we do not wish to be limited thereto as there might be changes made in the arrangement, disposition and form of the parts without departing from the principle of the present invention as comprehended within the scope of the appended claims.

What we claim is:

1. In combination a free piston generator, first means for feeding a liquid fuel to said free piston generator, second means for feeding a gaseous fuel to said free piston generator, both of said first and second means being operative by a regulating pressure, a first circuit for supplying said regulating pressure to said first means, first safety devices within said first circuit controlled by first factors of operation of said free piston generator and adapted to cut off the downstream portion of said first circuit from its upstream portion and to connect the former portion with the atmosphere when said first factors of operation come out from a predetermined range of values, a second circuit for supplying said regulating pressure to said second means, second safety devices within said second circuit controlled by second factors of operation of said free piston generator adapted to cut off the downstream portion of said second circuit from its upstream portion and to connect the former portion with the atmosphere when said second factors of operation come out from a predetermined range of values, said second circuit branching off from said first circuit downstream from said first safety devices, whereby operation of said first safety devices cuts off both the liquid and gaseous fuel feeding to said free piston generator whereas operation of said second safety devices cuts off only the gaseous fuel feeding to said free piston generator.

2. In combination a free piston generator comprising a motor cylinder and a piston assembly, part of which reciprocates in said motor cylinder, first means for feeding a liquid fuel to said motor cylinder operative by a regulating pressure, second means for feeding a gaseous fuel to said motor cylinder operative by said regulating pressure, a first circuit for supplying said regulating pressure to said first means, a first safety device within said first circuit operative by said piston assembly and adapted to cut off the downstream portion of said first circuit from its upstream portion and to connect the former portion with the atmosphere when said piston assembly, in its outwards stroke, goes beyond a predetermined maximum exterior dead end centre, a second circuit for supplying said regulating pressure to said second means, a second safety device within said second circuit operative by the gaseous fuel pressure in said second means and adapted to cut off the supply of said regulating pressure to said second means when the former pressure drops below a predetermined lowest value, said second circuit branching off from said first circuit downstream from said first safety device, whereby operation of said first safety device cuts off both the liquid and gaseous fuel feeding to said free piston generator whereas operation of said second safety device cuts off only the gaseous fuel feeding to said free piston generator.

3. In combination a free piston generator comprising a motor cylinder and a piston assembly, part of which reciprocates in said motor cylinder, an air feed casing surrounding said motor cylinder, first means for feeding a liquid fuel to said motor cylinder operative by a regulating pressure, second means for feeding a gaseous fuel to said motor cylinder operative by said regulating pressure, a first circuit for supplying said regulating pressure to said first means, a first safety device within said first circuit operative by said piston assembly and adapted to cut off the downstream portion of said first circuit from its upstream portion and to connect the former portion with the atmosphere when said piston assembly, in its outwards stroke, goes beyond a predetermined maximum exterior dead end centre, a second circuit for supplying said regulating pressure to said second means, a second safety device within said second circuit operative by the pressure in said air feed casing and adapted to cut off the supply of said regulating pressure to said second means when the former pressure drops below a predetermined lowest value, said second circuit branching off from said first circuit downstream from said first safety device, whereby operation of said first safety device cuts off both the liquid and gaseous fuel feeding to said free piston generator whereas operation of said second safety device cuts off only the gaseous fuel feeding to said free piston generator.

4. In combination a free piston generator comprising a motor cylinder and a piston assembly, part of which reciprocates in said motor cylinder, first means for feeding a liquid fuel to said motor cylinder operative by a regulating pressure, second means for feeding a gaseous fuel to said motor cylinder operative by said regulating pressure, a first circuit for supplying said regulating pressure to said first means, a first safety device within said first circuit operative by the gaseous fuel pressure in said second means and adapted to cut off the downstream portion of said first circuit from its upstream portion and to connect the former portion with the atmosphere when said gaseous fuel pressure rises above a predetermined highest value, a second circuit for supplying said regulating pressure to said second means, a second safety device within said second circuit operative by the gaseous fuel pressure in said second means and adapted to cut off the supply of said regulatiing pressure to said second means when the former pressure drops below a predetermined lowest value, said second circuit branching off from said first circuit downstream from said first safety device, whereby operation of said first safety device cuts off both the liquid and gaseous fuel feeding to said free piston generator whereas operation of said second safety device cuts off only the gaseous fuel feeding to said free piston generator.

5. In combination a free piston generator comprising a motor cylinder and a piston assembly, part of which reciprocates in said motor cylinder, and air feed casing surrounding said motor cylinder, first means for feeding a liquid fuel to said motor cylinder operative by a regulating pressure, second means for feeding a gaseous fuel to said motor cylinder operative by said regulating pressure, a first circuit for supplying said regulating pressure to said first means, a first safety device within said first circuit operative by the gaseous fuel pressure in said second means and adapted to cut off the downstream portion of said first circuit from its upstream portion and to connect the former portion with the atmosphere when said gaseous fuel pressure rises above a predetermined highest value, a second circuit for supplying said regulating pressure to said second means, a second safety device within said second circuit operative by the gaseous fuel pressure in said second means and adapted to cut off the supply of said regulating pressure to said second means when the former pressure drops below a predetermined lowest value, said second circuit branching off from said first circuit downstream from said first safety device, whereby operation of said first safety device cuts off both the liquid and gaseous fuel feeding to said free piston generator whereas operation of said second safety device cuts off only the gaseous fuel feeding to said free piston generator.

6. In combination a free piston generator comprising a motor cylinder defining a combustion chamber, a source of gaseous fuel under pressure, communication means between said source and said combustion chamber, first valve means operative by a regulating pressure to open said communication means, second valve means in said communication means between said source and said first valve means and controlling the latter such that it cannot be opened by said regulating pressure when said second valve means are open, a duct cooperating with said communication means and bypassing said first valve means in order to provide for equalization of the gas pressures on both sides of said first valve means when said second valve means close said communication means.

7. In combination a free piston generator comprising a motor cylinder defining a combustion chamber and a piston assembly part of which reciprocates in said motor cylinder, a source of gaseous fuel, communication means between said source and said combustion chamber, an inlet valve controlling the flow of gaseous fuel from said communication means into said combustion chamber, pump means responsive to the reciprocation of said piston assembly for cyclically opening and closing said inlet valve, another valve means in said communication means between said inlet valve and said source, means responsive to a control pressure adapted, on the one hand, to cut off the connection between said pump and said inlet valve and to close said another valve means when said control pressure drops below a predetermined value and, on the other hand, to operatively connect said pump and said inlet valve and to open said another valve means when said control pressure rises beyond said predetermined value, said last mentioned means being arranged to open said another valve means before operatively connecting said pump and said inlet valve.

References Cited by the Examiner
UNITED STATES PATENTS

| | | | |
|---|---|---|---|
| 1,338,017 | 4/1920 | Hoyte | 123—198 |
| 2,294,152 | 8/1942 | Yates et al. | 123—120 X |
| 2,518,400 | 8/1950 | Thompson | 123—121 X |
| 2,555,818 | 6/1951 | Shirley | 123—27 |
| 2,714,883 | 8/1955 | Mitzger | 123—27 |
| 2,767,691 | 10/1956 | Mengelkamp et al. | 123—121 X |
| 2,903,599 | 9/1959 | Huber | 60—13 X |
| 2,974,677 | 3/1961 | Natho | 137—246.12 X |
| 3,152,583 | 10/1964 | Horgen et al. | 123—27 |

MARK NEWMAN, *Primary Examiner.*

JULIUS E. WEST, RICHARD B. WILKINSON,
*Examiners.*